US006391393B1

(12) United States Patent
Martin et al.

(10) Patent No.: US 6,391,393 B1
(45) Date of Patent: May 21, 2002

(54) METHOD FOR MAKING FIELD-STRUCTURED MEMORY MATERIALS

(75) Inventors: James E. Martin, Tijeras; Robert A. Anderson; Chris P. Tigges, both of Albuquerque, all of NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/791,505

(22) Filed: Feb. 22, 2001

(51) Int. Cl.$^7$ .................................................. C08F 2/46
(52) U.S. Cl. ........................ 427/487; 427/128; 427/130; 427/132; 427/385.5; 427/532; 427/548; 427/599
(58) Field of Search .................. 427/487, 128, 427/130, 132, 385.5, 532, 548, 599

(56) References Cited

FOREIGN PATENT DOCUMENTS

HK            5954991         9/1999   .............. 252/62.52

OTHER PUBLICATIONS

Martin, J.E., Venturini, E., Odinek, J., and Anderson, R., "Anisotropic magnetism in field–structured composites," Physical Review E, 2000, 61, 3, 2818–2830. (No month avail.)

Martin, J.E., Anderson, R., and Tigges, C., "Simulation of the athermal coarsening of composites structured by a uniaxial field," J. of Chem. Phys., 1998, 108, 9, 3765–3787.

Martin, J.E., Anderson, R., and Tigges, C., "Simulation of the athermal coarsening of composites structured by a biaxial field," J. of Chem. Phys., 1998, 108, 8, 7887–7900.

O'Grady, K., Bradbury, A., Popplewell, J., Charles, S.W., and Chantrell, R.W., "The effect of field induced texture on the properties of a fine particle system," J. of Magnetism and Magnetic Materials, 1985, 49, 106–116.

Brugel, D., Gibbs, M.R.J., and Squire, P.T., "Particulate metallic glass composite magnetostrictors for interferometric magnetometry," J. Appl. Phys., 1988, 63(8), 4249–4251.

Fabre, P., Ober, R. and Veyssie, M., "Smectic ferrofluid," J. of Magnetism and Magnetic Materials, 1990, 85, 77–81.

Duenas, T.A., Hsu, L, amd Carman, G.P., Magnetostrictive composite material systems analytical/experimental, Mat. Res. Soc. Symp. Proc., 1997, 459, 527–543.

Anjanappa, M. and Wu, Y., "Magnetostrictive particulate actuators: configuration, modeling and characterization," Smart Mater. Struct., 1997, 6, 393–402.

Shiga, T., Okada, A., and Kurauchi, T., "Magnetoviscoelastic behavior of composite gels," J. Appl. Poly. Sci., 1995, 58, 787–792.

Jin, S., Tiefel, T.H. and Wolfe, R., "Directionally–conductive, optically–transparent composites by magnetic alignment,"IEEE Trans. on Magnetics, 1992, 28, 5, 2211–2213.

Primary Examiner—Bernard Pianalto
(74) Attorney, Agent, or Firm—Elmer A. Klavetter

(57) ABSTRACT

A method of forming a dual-level memory material using field structured materials. The field structured materials are formed from a dispersion of ferromagnetic particles in a polymerizable liquid medium, such as a urethane acrylate-based photopolymer, which are applied as a film to a support and then exposed in selected portions of the film to an applied magnetic or electric field. The field can be applied either uniaxially or biaxially at field strengths up to 150 G or higher to form the field structured materials. After polymerizing the field-structure materials, a magnetic field can be applied to selected portions of the polymerized field-structured material to yield a dual-level memory material on the support, wherein the dual-level memory material supports read-and-write binary data memory and write once, read many memory.

19 Claims, 4 Drawing Sheets

METHOD FOR MAKING FIELD-STRUCTURED MEMORY MATERIALS

This invention was made with Government support under Contract No. DE-AC04-94AL85000 awarded by the Department of Energy. The Government has certain rights in the invention.

BACKGROUND OF THE INVENTION

The invention relates to a method for making materials for use in memory applications and, more particularly, to a method for making field-structured materials for use in memory applications.

Field-structured materials are a recently-discovered class of materials possessing a substructure of ordered aggregates of suspended dielectric or magnetic particles. This substructure self-assembles under the influence of an external field, such as an external electric or magnetic field, and induces a wide range of mechanical, dielectric, magnetic, and optical properties. When a magnetic particle suspension, consisting of multi-domain particles, is exposed to a uniaxial magnetic field, the magnetic dipole moment on the particles will generally increase and align with the applied field. The particles will then migrate under the influence of the dipolar interactions with neighboring particles, to form complex chain-like structures (Martin et al., J. Chem. Phys., 1998, 108, 3765; Martin et al., J. Chem. Phys., 1998, 108, 7887). If a magnetic particle suspension is instead exposed to a biaxial (e.g., rotating) magnetic field, the induced dipole moments create a net attractive interaction in the plane of the field, resulting in the formation of complex sheet-like structures. Similar effects occur when suspensions of dielectric particles are subjected to uniaxial and biaxial electric fields. These materials, called field-structured composite (FSC) materials, can have large anisotropies in properties such as their conductivity, permittivity, dielectric breakdown strength, and optical transmittance.

Some magnetic particle/polymer composites have been made in the presence of a uniaxial magnetic field. There have been several studies of the magnetic properties of such materials. O'Grady et al (O'Grady et al., J. Magn. & Magn. Mat., 1985, 49, 106) created two different ferrofluids by the thermolysis of di-cobalt octacarbonyl in toluene, controlling the particle size by appropriate surfactant selection. This resulted in a superparamagnetic particle sample, consisting of 5.0 nm particles, and a ferromagnetic sample consisting of 12.0 nm particles, and these particles apparently consisted of essentially single crystalline domains, so that texture could be introduced into the samples by particle alignment. In the superparamagnetic sample, a significant increase in the susceptibility was found when the samples were field-cooled, which oriented the particles in the frozen solvent, leading to significant texture, since each particle consists of essentially a single crystalline domain. In the ferromagnetic particle sample, a significant increase in the remanence was observed in a field-cooled sample, again due to particle rotation along an easy axis creating significant texture. Brugel et al. (Brugel et al., J. Appl. Phys., 1998, 63, 4249) made platelets by ball-milling a thin film of Metglas 2605SC. The platelets were oriented in a magnetic field of 0.4 T, due to the relatively small demagnetizing field in the plane of the platelets, and the polymer resin was then cured. Shifts in the magnetization curves of these materials were found which they attributed to particle alignment, though it is possible that the observed shifts were partly due to the strong local fields produced by particle chains. Jin et al. (Jin et al., IEEE Trans. On Magnetics, 1992, 28, 2211) have investigated uniaxial FSCs of 20 and 75 nm Ni particles coated with a thin layer of Ag.

Hong et al. (U.S. Pat. No. 5,954,991, issued on Sep. 21, 1999) teaches the formation of ordered structures in a thin film of a homogeneous magnetic fluid by exposing the thin film to an external magnetic field. The magnetic fluid consists essentially of $Fe_2O_3$ particles coated with a surfactant and dispersed in a non-emulsion liquid, either simple or cyclic hydrocarbons.

A number of researchers have investigated the magnetostriction of uniaxial FSCs, an effect that is at least partly dependent on the magnetic susceptibility anisotropies. Shiga et al. (Shiga et al., J. Appl. Polym. Sci., 1995, 58, 787) created uniaxial FSCs from iron particles in a silicone elastomer and found a large magnetostriction effect along the direction of the structuring field, reported as an increase in the composite shear modulus in a field aligned along the shear gradient, which is also the direction of particle chaining. Anjanappa et al. (Anjanappa et al., Smart Mater. Struc., 1997, 6, 393) and Duenas et al. (Duenas, et al., Mat. Res. Soc. Symp. Proc., 1997, 459, 527) have reported magnetostriction measurements of composites of highly magnetostrictive, field aligned Terfenol-D particles in a polymeric host, and Duenas et al. report chain formation. An enhancement of a factor of roughly two was seen in the magnetostriction in the oriented particle samples. But the focus of these magnetostriction measurements was not on the magnetization properties of the composites, though the two phenomena are related.

Studies of the magnetic properties of sheet-like particle aggregates, such as those that form in rotating fields, are limited. Fabre et al. (Fabre et al., J. Magn. & Magn. Mat., 1990, 85, 77) created sheets of superparamagnetic maghemite particles by swelling a lamellar micelle solution of the surfactant/cosurfactant system sodium dodecyl sulfate/pentanol with nanosize maghemite in cyclohexane to form a lamellar microemulsion. Due to the strong dependence of demagnetizing factors on lamellar orientation, these fluid phases would orient in modest fields (100 Oe), so that the magnetic field is parallel to the lamallae. Measurements of the magnetization of these phases was not reported.

DESCRIPTION OF SPECIFIC EMBODIMENTS

Figure 1:
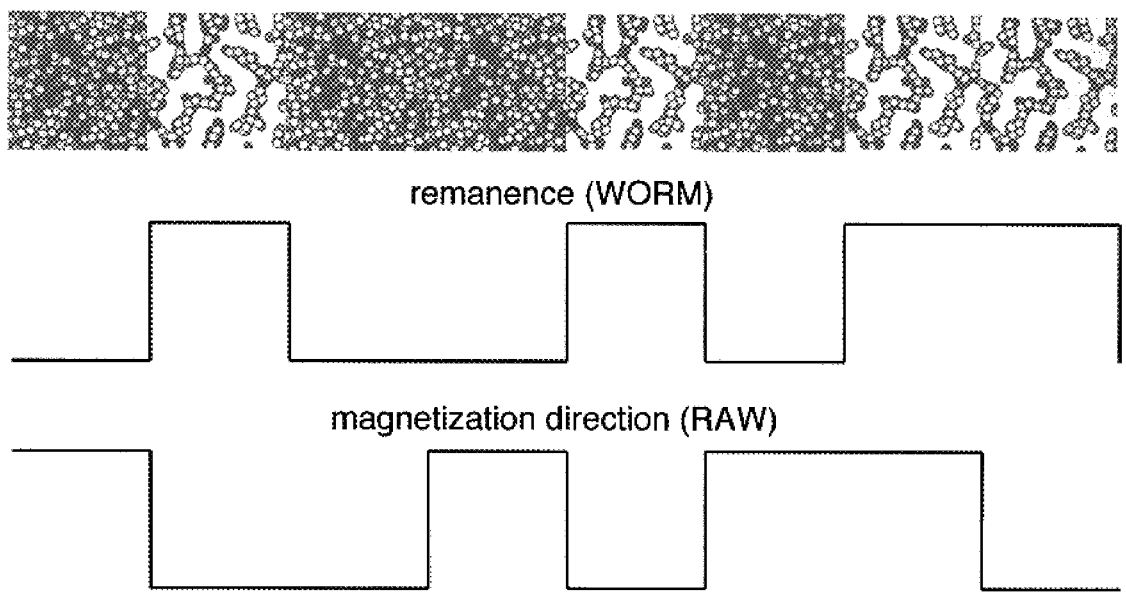
FIG. 1 shows an illustration of a memory pattern that can be produced by the method of the present invention.

Field structured composite materials are produced by first forming a dispersion of magnetic particles in a nonmagnetic fluid medium. Here the term nonmagnetic implies the relative absence of collective magnetic properties, such as ferromagnetism. Typically, the magnetic particles will be electrically conducting and the fluid medium will not, but this is not required. When electrically conducting magnetic particles are to be included, they can comprise electrically conducting magnetic material, or nonconducting magnetic material coated with a conducting layer, typically metallic in nature. The dispersion is then subjected to a field, either an electric field or magnetic field. For example, when the dispersion is subjected to a uniaxial or biaxial magnetic field, rod-like or sheet-like structures, respectively, are formed. If the field direction is fixed, and the sample is stationary, then rod-like structures are formed. If the field direction is fixed, and the sample is rotated (or the field is rotated and the sample stationary), sheet-like structures are formed. Any material whose structure results form the magnetic or electric field-induced formation of aggregates in a distribution of magnetic particles in a fluid medium are field-structured composite materials. A uniaxial field produces chain-like particle structures, and a biaxial field produces sheet-like particle structures (Martin et al., Physical Review E, 2000, 61(3), 2818–2830). In either case, these anisotropic structures affect the measured magnetic hysteresis loops, with the magnetic remanence and susceptibility increased significantly along the axis of the structuring field, and decreased slightly orthogonal to the structuring field, relative to the unstructured particle composite. The coercivity is essentially unaffected by structuring.

In the method of the present invention, a dispersion of ferromagnetic particles is formed in a polymerizable liquid medium, such as a polymerizable liquid resin as a thermosetting resin, a polymer or a gel. A film is formed from this dispersion on a support for this dispersion using standard techniques. A localized uniaxial or biaxial field, either electric or magnetic, is selectively applied to a portion of the film, resulting in a field structured composite material with chain-like structures in the field-exposed area. The chain-like structures can be formed very rapidly, with the formation time as short as one millisecond or less in strong fields. The liquid phase of the material is then polymerized, stabilizing the chain-like structures formed. This polymerization can be accomplished by an ultraviolet or chemically-initiated process or a thermoplastic polymer could be used in a cooling process to trap the structures. The polymerized material can be magnetized by standard techniques to store read-and-write (RAW) binary data, with the sign of magnetization determining whether a "0" or "1" is encoded. An interesting and useful result of studies of these FSC materials is that the magnetic remanence, as well as the susceptibility, increases significantly along the axis of the structuring field and decreases slightly orthogonal to the structuring field, relative to the unstructured particle composite. The coercivity is essentially unaffected. Therefore, the remanent magnetization of the chained areas is greater than that of the unchained areas and thus the remanent magnetization can be used as a second level of memory to store information, that is a "write once, read many" (WORM) memory that is immutable to alteration by magnetic fields. The method of the present invention permits development of a material with RAW memory that can be altered at will but with a second level of WORM memory that is immutable that can be used to encode other information, such as secure information, verification information, or a set of fixed instructions. One example of an application of the method of the present invention is for magnetic stripes on security badges, credit or debit cards and the like, where the encoded RAW data includes alterable personal identification data but with encoded WORM data that could not be altered and would not be read or duplicated using conventional RAW technology.

If the WORM and RAW data are spatially commensurate, they can be read simultaneously. If not, the RAW data could be read and stored, the supported material magnetized, the WORM data read, and the original RAW data rewritten.

In one embodiment, the field structured composite material on a support is subjected to a selective and localized magnetic field and this media conventionally magnetized to produce a memory pattern as illustrated in FIG. 1, where the abscissa represents the displacement along the media and the ordinate represents the magnetization, with the solid horizontal lines indicating zero magnetization. In this illustration the RAW byte "10110010" is stored in the spatial variation of the direction of magnetization, with positive magnetization being "1" and negative magnetization being "0", as conventionally described. In the two-level magnetic memory application of this embodiment, the amplitude of the magnetization stores the WORM byte "10001001", where the value or amplitude of the WORM byte along the media is completely independent of the value of the RAW byte and determined by where the FSC material was exposed to the localized magnetic field. Although, in this embodiment, the boundaries between the RAW and WORM bits are coincident (that is, the data areas are commensurate), this need not be the case. In the method of the present invention, any memory pattern can be stored where the amplitude of the magnetization of the WORM byte is stored independent of the RAW byte, thus producing a two-layer memory system.

In preparing field-structured composite materials, both magnetically soft and hard particles were used, including but not limited to particles comprising magnetic rare-earth materials, iron, and steel. In one embodiment, the soft magnetic particles were a 3–5 $\mu$m carbonyl iron powder, and was used to make samples with concentrations in the range of 2.0–30.0 vol %. The magnetically hard particles were made of $SmCo_5$, and were used at a concentration of 2.5 vol %.

The particles were suspended in a mixture of the epoxy resin using to provide a medium for testing. These suspensions were placed in an ultrasonic bath for 1 hr, and an amine hardener was stirred into the suspension. The suspensions were then placed in 1-cm square polystyrene cuvets and degassed in a vacuum oven at 50° C. for 10 minutes. A 150 G magnetic induction was supplied by two large plate magnets oriented such that the magnetic field was vertical, to prevent the sedimentation of evolving chain structures. The particular field strength utilized depends in part on the particle characteristics. To create a uniform biaxial field, the square cuvet was mounted on a motor and rotated around the four-fold axis at a speed of 100 rpm and the sample plunged into the center of the magnets. A rotating field can also be created with orthogonal coils in quadrature phase.

Curing the samples was done in several stages. The random particle dispersions, which are the control samples, were cured at 25° C. for 20 hrs while being rotated around the horizontal four-fold axis, to prevent sedimentation. This method gels the resin so that the particles cannot sediment, but does not fully cure the epoxy. To fully cure the epoxy, the samples were then post-cured by ramping from 50° C. to 100° C. over 3 hrs, and then curing at 100° C. for at least 3 more hrs. The biaxial samples were made in the same manner, but the initial, 25° C. cure was done in a rotating magnetic field. The uniaxial samples were placed in a uniaxial magnetic field and cured for 20 hrs at 50° C. to gel the resin. A post-cure was done by ramping from 50° C. to 100° C. over 3 hrs, and curing at 100° C. for at least 3 more hrs. These samples were then sectioned with a diamond saw for susceptibility measurements parallel and orthogonal to the direction of the structuring field.

Isothermal magnetic hysteresis data were measured at room temperature (293 K) for applied fields between +1 and −1 T (+6 and −6 T for $SmCo_5$) using a commercial magnetometer with extended dynamic range. The extended range allowed the use of relatively large random and FSC rectangular samples (typically 3×3×5 mm$^3$) with saturation moments up to 25 mA m$^2$ (25 emu) for 30 vol % iron. These dimensions are much larger than the coarseness of the field structuring, assuring a representative result. At the maximum field of 1 T these samples were in the reversible approach-to-saturation regime, minimizing any history effects in the measurements.

A diamond saw was used to prepare samples at concentrations of 2.8–30.0 vol. % particles into solid rectangles measuring roughly 3×3×5 mm. At each concentration, five samples were made: a control sample; a uniaxial sample with the 5 mm axis along the z axis of the FSC; a uniaxial sample with the 5 mm axis along the x axis of the FSC; a biaxial sample with the 5 mm axis along the z axis of the FSC; and a biaxial sample with the 5 mm axis along the x axis of the FSC. The 5 mm sample dimension was aligned along the magnetic field in the susceptometer. The corrected susceptibilities, $\chi$, as a function of concentration expressed as a volume fraction, are shown in Table I. The data demonstrates the anisotropy of the susceptibilities. The measured susceptibilities are corrected by demagnetization factors for the nonellipsoidal shapes of the samples (Martin et al., Physical Review E, 2000, 61(3), 2818–2830; incorporated herein by reference).

TABLE I

Susceptibility data

| Sample type | concentration | $\chi$ | Sample type | concentration | $\chi$ |
|---|---|---|---|---|---|
| control | 0.028 | 0.161 | control | 0.20 | 1.662 |
| uniaxial, z | 0.028 | 0.364 | uniaxial, z | 0.20 | 2.764 |
| uniaxial, xy | 0.028 | 0.109 | uniaxial, xy | 0.20 | 1.469 |
| biaxial, z | 0.028 | 0.077 | biaxial, z | 0.20 | 1.380 |
| biaxial, xy | 0.028 | 0.320 | biaxial, xy | 0.20 | 2.750 |
| control | 0.05 | 0.308 | control | 0.25 | 2.287 |
| uniaxial, z | 0.05 | 0.742 | uniaxial, z | 0.25 | 3.434 |
| uniaxial, xy | 0.05 | 0.247 | uniaxial, xy | 0.25 | 2.064 |
| biaxial, z | 0.05 | 0.141 | biaxiai, z | 0.25 | 2.027 |
| biaxial, xy | 0.05 | 0.805 | biaxial, xy | 0.25 | 3.073 |
| control | 0.10 | 0.712 | control | 0.30 | 2.936 |
| uniaxial, z | 0.10 | 1.355 | uniaxial, z | 0.30 | 4.066 |
| uniaxial, xy | 0.10 | 0.592 | uniaxial, xy | 0.30 | 2.912 |
| biaxial, z | 0.10 | 0.335 | biaxial, z | 0.30 | 3.030 |
| biaxial, xy | 0.10 | 1.593 | biaxial, xy | 0.30 | 3.900 |
| control | 0.15 | 1.162 | | | |
| uniaxial, z | 0.15 | 2.110 | | | |
| uniaxial, xy | 0.15 | 0.928 | | | |
| biaxial, z | 0.15 | 0.930 | | | |
| biaxial, xy | 0.15 | 2.130 | | | |

Figure 2:
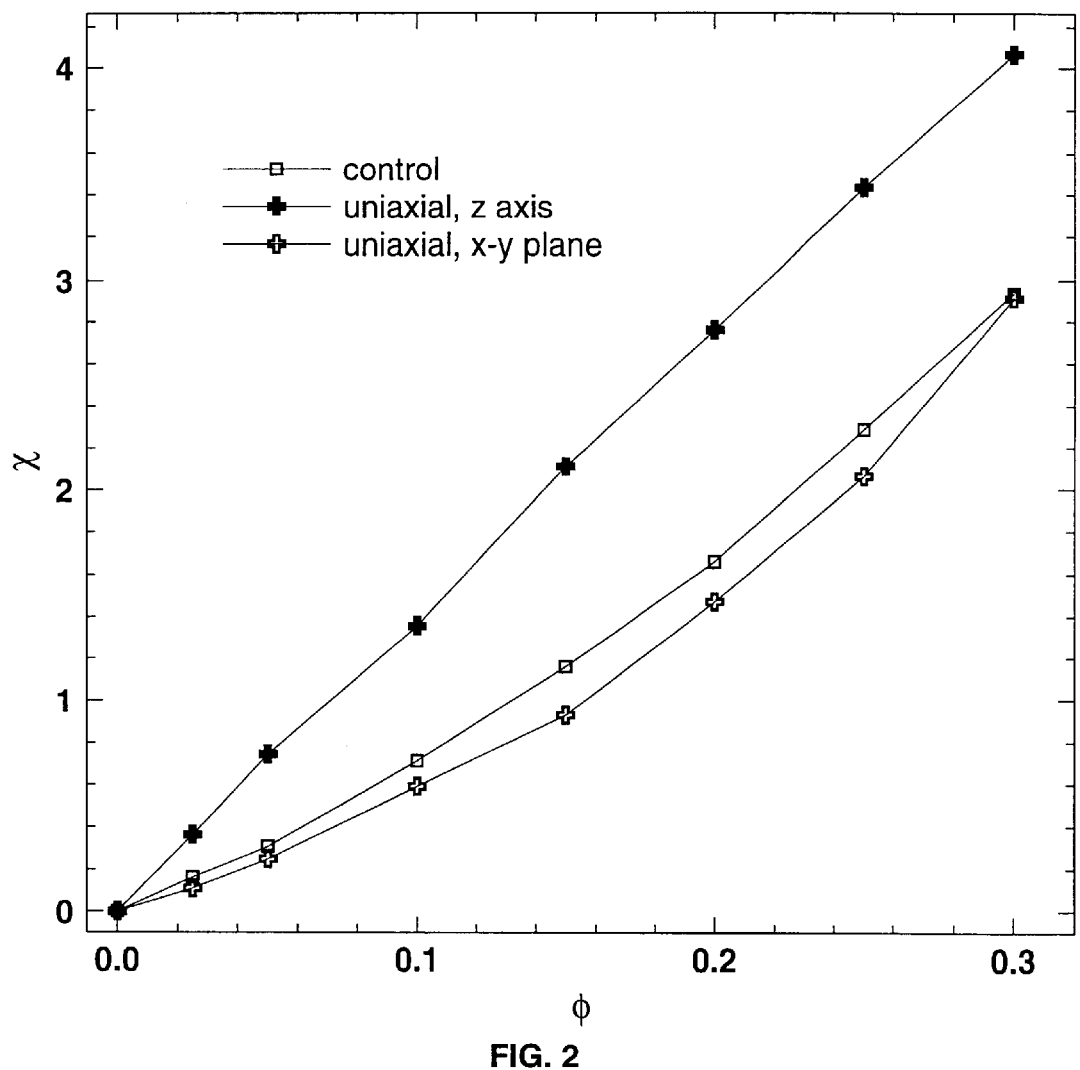
FIG. 2 shows susceptibility data for uniaxial field-structured composite materials.
Figure 3:
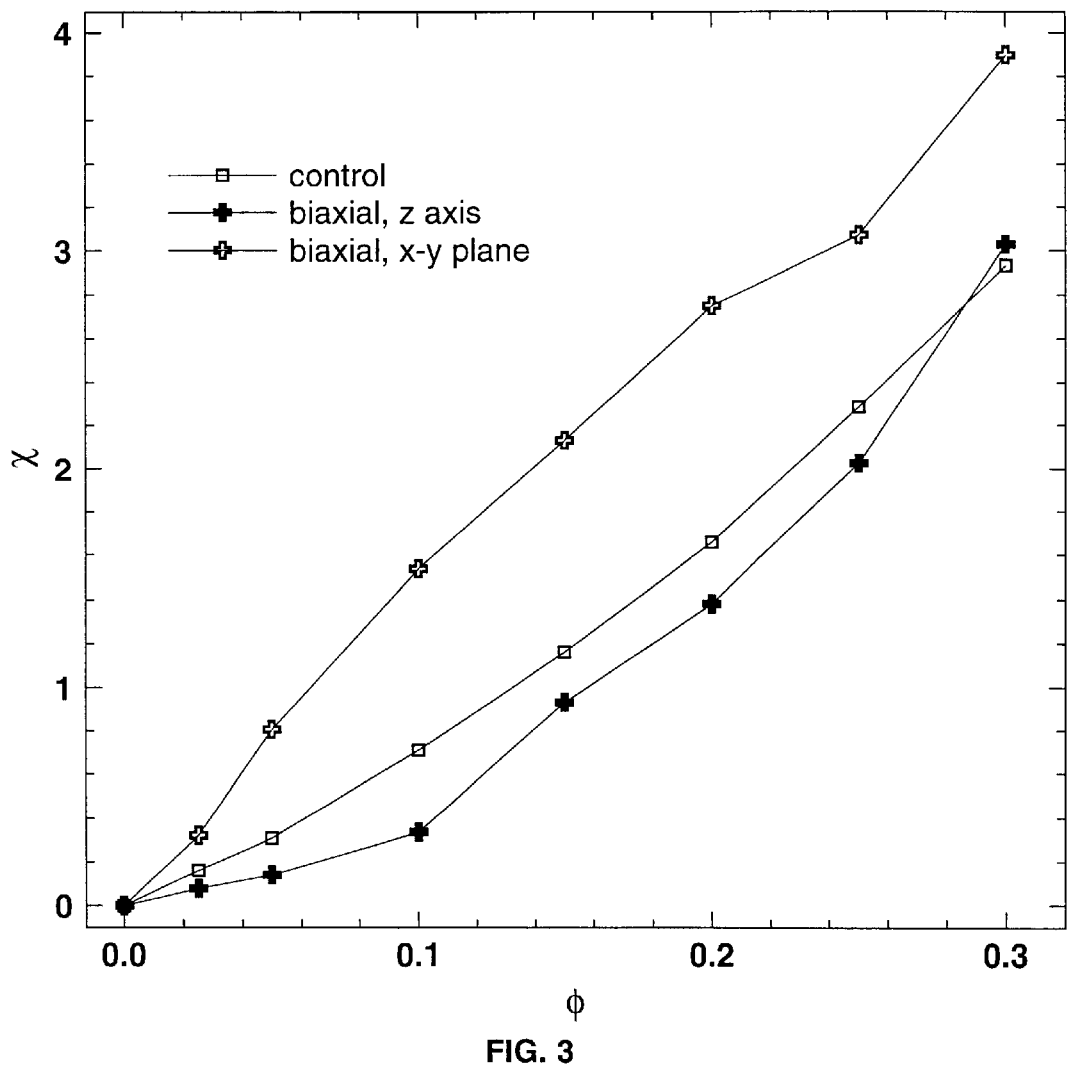
FIG. 3 shows susceptibility data for biaxial field-structured composite materials.

For the iron particles, the susceptibility data for the uniaxial FSCs are shown in FIG. 2 and the susceptibility data for the biaxial FSCs are shown in FIG. 3. The susceptibility anisotropy is $\rho=3.34$ for the uniaxial FSC at 2.8 vol. % and is $\rho=0.241$ for the biaxial FSCs at the same concentration.

For the magnetically hard particles of SmCo$_5$, 10 wt % BaTiO$_3$ particles were added to increase the suspension viscosity to reduce growth kinetics. FSCs were not formed in the biaxial fields used due to the hydrodynamic effects produced by particle rotation, so these examples were restricted to uniaxial composites.

Figure 4:
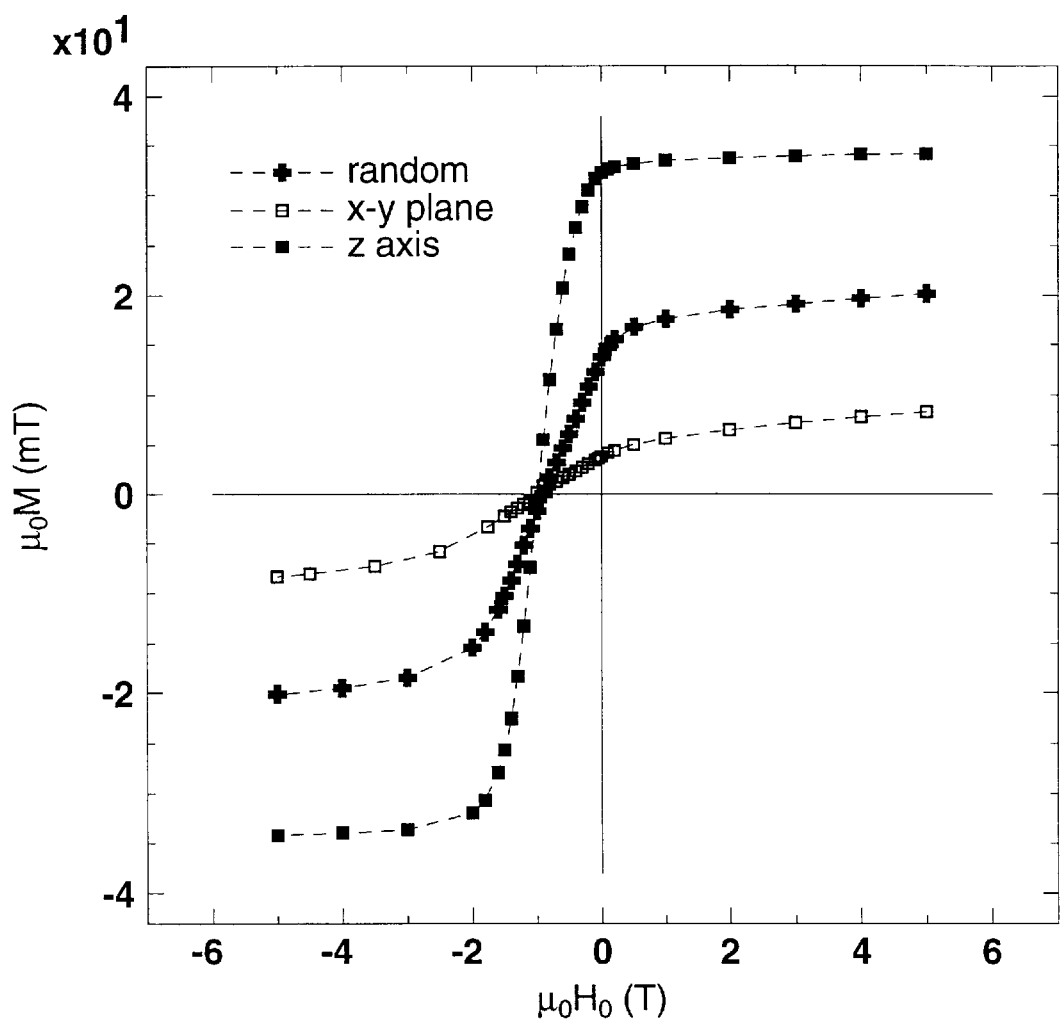
FIG. 4 shows remanence anisotropy for $SmCo_5$ particles.

The magnetization curves in FIG. 4 show a surprisingly large remanence anisotropy for this system, with $\mu_0M_r=3.8$ mT in the x-y plane and $\mu_0M_r=32.2$ mT along the z axis, where $\mu_0M_r$ is the remanent magnetization density times the vacuum permeability. This 8.5-fold anisotropy is larger than can be accounted for by local field effects (which predict at most a factor of 2.5), and because the apparent saturation magnetization is also anisotropic in this case, the excess remanence anisotropy can be attributed to the large crystalline anisotropy in these particles, which must align along an easy axis when the field is applied.

The materials studied show that the magnetism of uniaxial and biaxial field-structured composites yield substantial alterations in the magnetization curves. In soft, spherical magnetic particle composites, the susceptibility at the coercive field increases substantially in the direction or plane of the structuring field, and decreases in the orthogonal directions. Uniaxial FSCs have one high susceptibility axis and two low axes; biaxial FSCs have two high axes and one low axis. The remanence is altered accordingly, but the coercive field and the hysteretic losses are unchanged by structuring. The sum of the inverse susceptibilities along the principal axes of the material is invariant to structuring.

FSCs of magnetically hard particles exhibit an anisotropy in the magnetic remanence that is much larger than expected, based on the self-consistent point dipole approximation. This is attributed to the large crystalline anisotropy, which causes particles to align along an easy magnetization axis.

Magnetic Stripe Production

To be compatible with most plastics commonly used to make the cores of today's cards and badges, a urethane acrylate-based photopolymer is used to bind the magnetic particles into the stripe. A solvent can be optionally added to increase the resin viscosity or the resin can be heated. Once the magnetic particles are added to the resin to form the dispersion, the dispersion solution is applied to the support card or badge surface, such as by a painting, rolling or spraying technique. Films of approximately 0.02 mm or less are commonly used. The film is then subjected to the uniaxial or biaxial field in selected areas to form the FSC material in those selected areas. The film can then be polymerized and then the RAW information written by a magnetic field applied to the film in selected areas, generally coincident with the areas defined by the FSC process. Thus produced is a magnetic stripe with selected areas of the entire film having the FSC material possessing both RAW and WORM memory information.

The invention being thus described, it will be apparent to those skilled in the art that the same may be varied in many ways. Such variations are not to be regarded as a departure from the spirit and scope of the invention, and all such modifications are intended to be included within the scope of the following claims

We claim:

1. A method of forming a dual-level memory material on a support, comprising:

forming a dispersion of ferromagnetic particles in a polymerizable liquid medium;

forming a film of said dispersion of ferromagnetic particles in the polymerizable liquid medium on a support;

applying an energetic field to selected portions of said film to give a field-structured material comprising chain-like structures in said selected portions of said film on said support;

polymerizing said field-structured material; and applying a magnetic field to selected portions of said polymerized field-structured material to yield a dual-level memory material on said support, wherein the dual-level memory material supports read-and-write binary data memory and write once, read many memory.

2. The method of claim 1 wherein the ferromagnetic particles comprise materials selected from the group consisting of rare-earth materials, iron, and steel.

3. The method of claim 2 wherein the ferromagnetic particles comprise samarium cobalt.

4. The method of claim 2 wherein the ferromagnetic particles comprise carbonyl iron.

5. The method of claim 1 wherein the polymerizable liquid medium is selected from the group consisting of a polymerizable liquid resin, a polymer and a gel.

6. The method of claim 1 wherein the energetic field is selected from a magnetic field and an electric field.

7. The method of claim 6 wherein the magnetic field has a strength of approximately 150 G.

8. The method of claim 6 wherein the magnetic field is uniaxial and the field-structured material comprises rod-like structures.

9. The method of claim 6 wherein the magnetic field is biaxial and the field-structured material comprises sheet-like structures.

10. The method of claim 1 wherein the field-structured material has a magnetic remanence measured along the axis of the energetic field in said selected portions comprising chain-like structures greater than the magnetic remanence of said film that had not been exposed to said energetic field.

11. The method of claim 1 wherein the field-structured material has a susceptibility measured along the axis of the energetic field in said selected portions comprising chain-like structures greater than the susceptibility of said film that had not been exposed to said energetic field.

12. The method of claim 1 wherein the chain-like structures are formed in less than approximately one millisecond.

13. The method of claim 1 wherein the read-and write binary data memory can be altered by exposure to a magnetic field.

14. The method of claim 1 wherein the write once, read many memory is immutable after being exposed once to a magnetic field.

15. The method of claim 1 wherein the film has spatially commensurate areas of read-and-write binary data memory and write once, read many memory.

16. The method of claim 1 wherein the polymerizable liquid medium is a urethane acrylate-based photopolymer.

17. The method of claim 16 wherein the film is applied to the support as a stripe.

18. The method of claim 16 wherein the film is less than approximately 0.02 mm thick.

19. A method of forming a dual-level memory material on a support, comprising:

forming a dispersion of ferromagnetic particles, said ferromagnetic particles selected from carbonyl iron particles and samarium cobalt particles, said carbonyl iron particles having diameters of less than approximately 5 microns, in a mixture of a polymerizable epoxy resin and amine hardener;

forming a film of said dispersion on a support;

applying a biaxial magnetic field to selected portions of said film to give a field-structured material comprising chain-like structures in said selected portions of said film on said support;

polymerizing said field-structured material; and applying a magnetic field to selected portions of said polymerized field-structured material to yield a dual-level memory material on said support, wherein the dual-level memory material supports read-and-write binary data memory and write once, read many memory.

* * * * *